Figure 1:
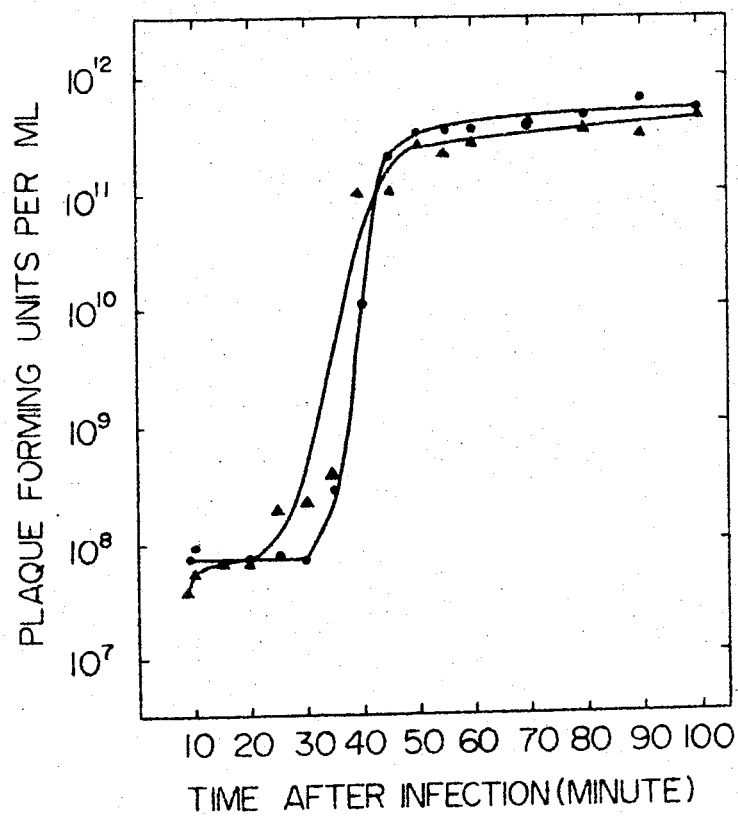

United States Patent

Yamabe et al.

[15] 3,697,514
[45] Oct. 10, 1972

[54] 4-NITROPYRROLE-2-CARBOXYLIC ACID AMIDE DERIVATIVES

[72] Inventors: Shigeru Yamabe, Toyonaka-shi; Masanao Shimizu, Kobe-shi; Tadatsugu Yamamoto, Nara-shi, all of Japan

[73] Assignee: Dainippon Pharmaceutical Co., Ltd., Osaka, Japan

[22] Filed: Dec. 29, 1969

[21] Appl. No.: 888,427

[30] Foreign Application Priority Data

Dec. 29, 1968 Japan ..........................43/725
Jan. 7, 1969 Japan ........................44/1434

[52] U.S. Cl.............260/240 G, 260/326.3, 424/274
[51] Int. Cl. ..............................................C07d 27/26
[58] Field of Search............260/240 G, 240 A, 326.3

[56] References Cited

FOREIGN PATENTS OR APPLICATIONS

M3,093  2/1965  France....................260/326.3

OTHER PUBLICATIONS

Neth. Application 6,405,652, Nov. 23, 1964; Chem. Abstracts 62:16196f.

*Primary Examiner*—Henry R. Jiles
*Assistant Examiner*—G. Thomas Todd
*Attorney*—Sherman and Shalloway

[57] ABSTRACT

Novel 4-nitropyrrole-2-carboxylic acid amide derivatives of the general formula I below:

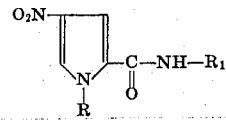

in which R is selected from the group consisting of hydrogen atom and alkyl groups of one to eight carbons, and $R_1$ is selected from the group consisting of amino, amidino, and

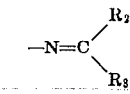

groups, $R_2$ and $R_3$ being each selected from the group consisting of hydrogen, alkyl of one to eight carbons, phenyl, and substituted phenyl, and which may be same or different, processes for their preparation, pharmaceutical compositions comprising said derivatives, and a method for using said compositions. These novel derivatives exhibit anti-Trichomonas vaginalis action as well as a very unique action of promoting release of virus out of cells.

2 Claims, 2 Drawing Figures

4-NITROPYRROLE-2-CARBOXYLIC ACID AMIDE DERIVATIVES

This invention relates to 4-nitropyrrole-2-carboxylic acid amide derivatives, processes for their preparation, pharmaceutical compositions comprising said derivatives, and a method for using said compositions.

It is now discovered that the novel 4-nitropyrrole-2-carboxylic acid amide derivatives obtained in accordance with the present invention exhibit anti-Trichomonas vaginalis action as well as a very unique action of promoting release of virus out of cells.

According to this invention, therefore, novel and useful 4-nitropyrrole-2-carboxylic acid amide derivatives of the general formula I below:

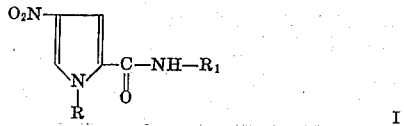

in which R is selected from the group consisting of hydrogen atom and alkyl groups of one to eight carbons, and $R_1$ is selected from the group consisting of amino, amidino, and

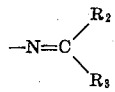

groups, $R_2$ and $R_3$ being each selected from the group consisting of hydrogen, alkyl of one to eight carbons, phenyl, and substituted phenyl, and which may be same or different, are provided.

In the above general formula I, R is preferably hydrogen atom or an alkyl of one to five carbon atoms which may be of straight chain or branched, e.g., methyl, ethyl, propyl, isopropyl, butyl, isobutyl, sec.-butyl, tert.-butyl, pentyl or isopentyl group, inter alia., hydrogen or methyl being preferred. $R_1$ is selected from the group consisting of amino, amidino, and

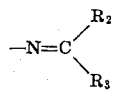

groups in which $R_2$ and $R_3$ may be some or different. Preferred $R_2$ and $R_3$ are each selected from the group consisting of hydrogen; straight chain or branched alkyl groups of one to five carbon atoms, e.g., methyl, ethyl, propyl, isopropyl, butyl, isobutyl, sec.-butyl, tert.-butyl, pentyl and isopentyl; phenyl; and substituted phenyl; preferred substituent in phenyl being selected from the group consisting of hydroxyl, carboxyl, straight chain or branched alkyl groups of one to five carbons, e.g., methyl, ethyl, propyl, isopropyl, butyl, isobutyl, sec.-butyl, tert.-butyl, pentyl, and isopentyl groups, straight chain or branched alkoxy groups of one to five carbons, e.g., methoxy, ethoxy, propoxy, isopropoxy, butoxy, isobutoxy, sec.-butoxy, pentyloxy and isopentyloxy groups, halogen atoms, e.g., fluorine, chlorine, bromine and iodine, and nitro group. It is particularly preferred that $R_1$ should be selected from amino, amidino, N-isopropylideneamino, N-(1-phenyl)ethylideneamino, and N-(ortho-hydroxy)benzylideneamino groups.

Some of the specific 4-nitropyrrole-2-carboxylic acid amide derivatives may be named as follows:

4-Nitropyrrole-2-carboxylic acid hydrazide (compound A).

1-Methyl-4-nitropyrrole-2-carboxylic acid hydrazide (compound B).

2-Amidinocarbamoyl-4-nitropyrrole (compound C).

2-Amidinocarbamoyl-1-methyl-4-nitropyrrole (compound D).

4-Nitropyrrole-2-carboxylic acid isopropylidenehydrazide (compound E).

1-Methyl-4-nitropyrrole-2-carboxylic acid isopropylidenehydrazide (compound F).

4-Nitropyrrole-2-carboxylic acid-1-phenylethylidenehydrazide (compound G).

1-Methyl-4-nitropyrrole-2-carboxylic acid(ortho-hydroxy)-benzylidenehydrazide (compound H).

Among the foregoing, particularly preferred compounds for the purpose of this invention are B, E, F, and H.

Hereinafter, "alkyl groups of one to five carbons" may be of straight chain or branched, and include methyl, ethyl, propyl, isopropyl, butyl, isobutyl, sec.-butyl, tert.-butyl, pentyl and isopentyl groups.

Also "alkoxy groups of one to five carbons" may be of straight chain or branched, and include methoxy, ethoxy, propoxy, isopropoxy, butoxy, isobutoxy, sec.-butoxy, pentyloxy, and isopentyloxy groups, etc.

"Halogen atoms" hereinafter appearing in this specification include chlorine, bromine, iodine, and fluorine.

Such 4-nitropyrrole-2-carboxylic acid amide derivatives of the general formula I,

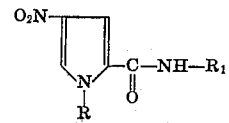

in which R and $R_1$ possess the same significations as defined in the foregoing
can be prepared by:

a. reacting the compounds of the general formula II,

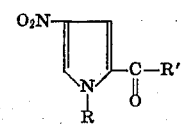

in which R has the same signification as defined before, and R' is selected from the group consisting of halogen atoms and alkoxy groups of one to five carbon atoms
with the compounds of general formula III below, $$NH_2—R_1 \qquad III$$

in which $R_1$ has the same signification as defined before.

b. Also the compounds of the general formula Ia which are within the scope of 4-nitropyrrole-2-carboxylic acid amide derivatives of formula I,

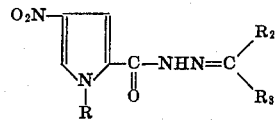

in which R, $R_2$ and $R_3$ have the same significations as defined before can be obtained by reacting the compounds of general formula Ib,

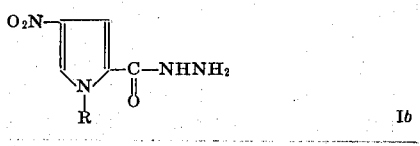

in which R has the same signification as defined above, with the compounds of general formula IV,

in which $R_2$ and $R_3$ have the same significations as defined above.

c. Furthermore, the compounds of general formula Ia', which are within the scope of the foregoing compounds of formula I and ia,

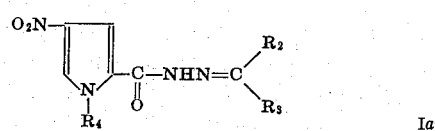

in which $R_2$ and $R_3$ have the same significations as defined before, and $R_4$ is an alkyl, preferably an alkyl of one to five carbon atoms, can be obtained by reacting the compounds of general formula Ia'',

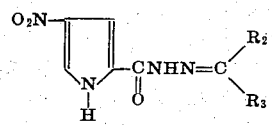

in which $R_2$ and $R_3$ have the same significations as defined before,
with the compounds of general formula V,

$$R_4-Y \qquad V$$

in which $R_4$ has the same signification as defined before, and

Y is selected from the group consisting of halogen atom, sulfuric acid alkyl ester residue and toluenesulfonic acid ester residue.

The reaction of above process a) is advantageously performed, when a compound of general formula II with halogen as the R', preferably chlorine or bromine, is used as one of the staring compounds, in an anhydrous organic solvent which is inert under the reaction conditions, e.g., anhydrous benzene, toluene, chloroform, and the like, preferably anhydrous benzene, at temperatures ranging from 0° C. to room temperature, for several hours, preferably 1 – 3 hours. Anhydrous reactants are favorably employed. It is also permissible to start the reaction under cooling, if so desired, and thereafter continuing the reaction at room temperature. Whereas, when a starting compound of general formula II with an alkoxy group of one to five carbon atoms as the R', preferably methoxy, ethoxy, or propoxy, is used, the reaction can be performed in a solvent which is inert under the reaction condition, such as water, alcohol, e.g., lower alkanol such as methanol, ethanol, etc., or in the absence of solvent, under heating to 100° – 200° C., preferably 140° – 160° C., for 3 – 10 hours, preferably 6 – 7 hours. It is a preferred practice to perform the reaction at elevated pressures, for example, in a sealed tube. The reaction of process (a) can be effected by using an excessive amount of the compound of general formula III as an acid binder.

Both the compounds of general formulas Ia and Ia' produced by the processes (b) and (c), and these of general formulas Ib and Ia'' used as the starting materials therein, are included within the compounds of general formula I produced by the above-described process (a). Therefore, the processes (b) and (c) can be regarded as the interchanging methods of the compounds of general formula I.

The process (b) can be effected by maintaining the reactants, in the presence of a solvent which is inert under the reaction conditions, such as water or alcohol, e.g., lower alkanol such as methanol or ethanol, at temperatures ranging from room temperature to 80° C., preferably 50° – 80° C., for 1 to 30 minutes, preferably from 1 to 10 minutes. If so desired, the solvent may be replaced by excessive amount of the starting compound.

The reaction of above process (c) can be performed by the steps comprising dissolving the compound of general formula Ia'' in an anhydrous alcohol, for example, lower alkanol such as methanol, ethanol, etc., containing an alkali metal alkoxide, for example, sodium- or potassium-methoxide, or sodium- or potassium-ethoxide, to convert the compound of general formula Ia'' to the corresponding alkali metal salt, adding further thereto the compound of general formula V, and maintaining the system at temperatures ranging from room temperature to 80° C., preferably at room temperature, for several hours, preferably 4 – 5 hours.

Thus produced compounds of general formulas I, Ia, and Ia' can be recovered by conventionally employed means, for example, recrystallization.

In the process (a), the compounds of general formulas II and III used as the starting materials can be prepared from known compounds or such compounds which can be prepared in the similar manner to the preparation of known compounds.

The starting compounds of general formula Ib to be employed in the process (b) are those obtained by the process (a), which can be prepared by reacting the compounds of general formula II with hydrazine in accordance with said process (a). The compounds of general formula IV are themselves known and readily available.

The compounds of general formula Ia'' used as the starting material of process (c) are obtained through the process (a) or (b) above. That is, they can be prepared by either reacting the compounds of general formula IIa,

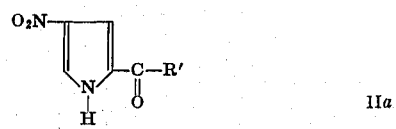

in which R' is selected from the group consisting of halogen atoms and alkoxy groups of one to five carbons with the compounds of general formula VI,

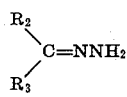

in which $R_2$ and $R_3$ have the same significations as defined before,
in accordance with the foregoing process (a), or by the steps of reacting the compounds of general formula IIa with hydrazine in accordance with the process (a), and thereafter reacting the resulting compounds of general formula Ib'

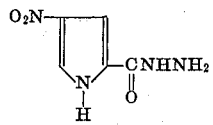

with the compounds of general formula IV in accordance with the process (b).

The compounds of formula I of this invention can be obtained as free base, or as addition salt of suitable acid. Such acid addition salts include those of inorganic acids such as sulfates, hydrohalides, perchlorates, nitrates and phosphates; and those of organic acids such as methanesulfonates, ethanesulfonates, hydroxyethanesulfonates, ethylenesulfonates, benzenesulfonates, toluenesulfonates, and naphthalenesulfonates, among these sulfates and hydrohalides being particularly preferred. These compounds may be applied to the practical use in the form of an acid addition salt as well as in the free base form.

The novel compounds of general formula I provided in accordance with the present invention exhibit interesting chemotherapeutic characteristics, such as demonstrated by the tests performed in the conventional manner against Trichomonas vaginalis. For example, one of the tests was performed as follows: sterile horse serum was added to a culture medium composed of 20 g of yeast extract, 10 g of glucose, 5 g of NaCl, 2 g of cysteine, 20 g of peptone, 2 ml of methylene blue solution (1 mg/ml), and 1,000 ml of distilled water, and to which diluted liquid of the test compound was added. Thereafter Trichomonas vaginalis was inoculated thereto, followed by 4 day cultivation at 37° C. The minimum concentration of the test compound required for inhibiting the growth of Trichomonas vaginalis (MIC--Minimum Inhibitory Concentration) was as given in the table below. At the indicated concentrations, no growth of Trichomonas vaginalis was observed in the specified culture medium on the third day from the inoculation.

MIC Against Trichomonas Vaginalis (in vitro)

| Tested Compound | MIC (mcg/ml) |
| --- | --- |
| A | 30 |
| B | 10 |
| D | 10 |
| E | 30 |
| F | 10 |
| G | 10 |
| H | 10 |

Thus the novel compounds of general formula I in accordance with the present invention are useful as anti-protozoal agents against obnoxious protozoa such as Trypanosoma (T. gambiense, T. rhodesiense, T. cruzi), Leishmania (L. donovani, L. tropica, L. braziliensis), Trichomonas (T. buccalis, T. hominis, T. pulmonalis, T. vaginalis), Sporozoa (Plasmodium spp.), Endamoeba (E. histolytica), etc., particularly as antitrichomonal agents against Trichomonas.

Accordingly, this invention also provides pharmaceutical compositions containing as the active ingredient the compounds of general formula I as mixed with pharmaceutically acceptable organic or inorganic, solid or liquid carriers.

The compositions of the invention can be orally, or parenterally, or locally administered into the rectum, to men, domestic animals such as cow, pig, and dog, and domestic fowls.

Suitable carriers useful for the compositions include those adjuvants commonly employed, such as water, lactose, starch, talc, magnesium stearate, vegetable oil, benzyl alcohol, tragacanth gum, polyalkylene glycol, etc.

As the compositions to be orally administered, tablets, capsules, pills, granular compositions, syrup and the like prepared in the conventional manner can be named. The indicated dose per day of the pharmaceutically active compound in that case ranges from 100 to 500 mg, preferably 300 – 450 mg, which can be administered in one to three divided times per day.

As the compositions to be applied locally or in the rectum, those containing the pharmaceutically effective amount of active ingredients as mixed with conventionally employed ointment base, such as hydrous lanolin, vaseline, soft vaseline, polyethylene glycol, and mixtures thereof, may be used.

It is now found that the compounds of general formula I of the invention possess the action to promote release of virus out of cells.

Phage, for example, Phage MS2 (Davis J. E., Strauss J. H., and Sinsheimer R. L., Science 134, 1427. (1961)), GA and Qβ (I. Watanabe, T. Miyake, T. Sakurai, T. Shiba and T. Ohno: Proc. Japan Acad. 43, 204 (1961)), δAc (T. Nishihara and I. Watanabe; Virus 17, 118 (1967)), and $T_4$ are the virus which infect bacteria and propagate in the bacteria. Agar culture medium was solidified as the nutrient source of bacteria, and on which soft agar culture medium mixed with bacteria e.g., approximately $2 \times 10^7$/ml) and phage (approximately 300/ml) was laminated and solidified, followed by an overnight incubation at 37° C. The bacteria grew in the culture medium, causing the latter to become opaque, and at the spots where phage propagated, cell lysis took place, forming small circular transparent spots. Such circles are referred to as "plaques."

The number of phage can be measured by counting the number of such plaques. For example, when 1 ml of liquid containing phage at unknown concentration is mixed with bacteria in accordance with above-described method and the number of plaques formed on the culture medium is counted, if it is 300, the phage concentration is determined to be 300 plaque-forming units/ml (p.f.u). Depending on such factors as type of the bacteria to be infected with phage it is not always the case that one phage particle equals one plaque-forming unit. Therefore, the concentration of phage is expressed by p.f.u.

When bacteriophage infects the host bacteria, nucleic acid alone of the phage enters into the bacteria, and progeny phage is produced in the bacteria, which causes cell lysis, subsequently causing release of the progeny phage from the bacteria. The one cycle from infection with phage to the release of phage is referred to "one-step growth." Repetition of one-step growth is referred to "multi-step growth." Plaque is an agglomerate of many lysed cells formed by multi-step growth of phage. Therefore, the more the steps of growth, the greater becomes the diameter of plaque.

We discovered that, when bacteria and phage are mixed in the presence of the novel compound of general formula I of the invention and incubated for an overnight in culture medium, the diameter of the plaque formed becomes more than twice greater than the case wherein the novel compound is absent. This fact clearly proves that, either the novel compound of the invention is effective for (A) increasing the amount of phage released from each host bacterium, or (B) shortening the time required for one-step growth, i.e., increasing the number of growth cycle performable within a definite time.

Heretofore, no compound which exhibits the above effect (A) is known. Whereas, a mutant of $T_4$ phage, $T_4r$, which has shorter time of growth cycle than that of ordinary phage is known [S. Benzer: *Proc. Nati. Acad., Sci.* U.S.A., 41, 344 (1955)]. However, the growth cycle-increasing effect is achieved by mutation in genetic property of phage, and compound having above-described action is yet unknown.

The suitable amount of use of the subject compound for this purpose ranges 30 – 300 mcg/ml, preferably approximately 100 mcg/ml; that of bacteria ranges $10^6 - 10^8$ cells/ml, preferably $10^7$ cells/ml; and that of phage, 100 – 1,000 p.f.u./ml, preferably 200 p.f.u./ml. The culture medium may be selected from those conventionally used, which are suited for growth of employed bacterial, preferably agar culture medium. Incubation can be performed in accepted manner, for example, performed at 37° C. for an overnight, with satisfactory result.

Furthermore, we carried out the following one-step growth experiment [Ellis, E. L., and M. Delbrueck, J. *Gen. Physical*, 22, 365 (1939)], in order to decide whether the plaque-enlargement effect of the subject novel compounds is due to the phenomenon (A) or (B) above. Bacteria and phage were mixed in a liquid culture medium into which the novel compound of this invention had been added. Separately, identical bacteria and phage were mixed in the same culture medium except that the subject compound was replaced by distilled water, as a control. After incubation at 37° C for 5 minutes the resulting liquid mixtures each contained uninfecting phage, phage-infected bacteria and phage-uninfected bacteria. Then phage anti-serum was added to inactive uninfecting phage, and immediately thereafter the mixtures were diluted to at least $10^4$ times to diluted the anti-serum. Such diluting is effective to make the antiserum inert to the later-released progeny phage, and the progeny phage are made uninfecting to the bacteria due to the resulting low concentration. Thus, the phage performs one-step growth only.

The initial stage of infection of bacteria with phage is adsorption of phage onto the bacterial surface. The probability of this adsorption is directly proportional to the product of phage concentration and bacterial concentration. For example, if phage and bacteria both at the concentrations of approximately $10^8$/ml are mixed as normally practiced, most of the phage adsorb on the bacterial surface within several minutes. Whereas, if the two are mixed at both the concentrations of $10^4$/ml, the adsorption probability is reduced to $1/10^8$. Accordingly, the diluting to $10^4$ times in the above one-step growth experiment can be safely regarded as reducing the probability of phage-infection of bacteria to substantially nil.

Phage antiserum bonds with coat protein of phage particles to inactivate phage. Once the nucleic acid of phage enters into bacteria, the antiserum is no more effective. That is, antiserum does not act on phage-infected bacteria, although it is active with uninfecting phage particles.

The foregoing experiment was further continued as follows. Each definite quantity of the diluted culture media obtained by the described one-step growth was taken at 5-minutes or 10-minutes intervals, starting from 10 minutes after the infection, and ending after 100 minutes from the infection. Thus, 15 – 19 samples taken from the diluted culture medium in which the compound of this invention was present, and also 15 – 19 samples taken from the diluted culture medium in which the novel compound was replaced by distilled water, were obtained. While any suitable number of samples may be prepared, 15 – 19 samples well meet the purpose of the experiment. Each sample was further diluted with the culture medium to $10^2 - 10^4$ times, whereby the compound of this invention being inactivated. Subsequently the diluted samples were each mixed with bacteria in soft agar culture medium, treated as described in the foregoing, and resulting plaques were counted to determine the respective phage concentration. In the graph of attached FIG. 1, plaque-forming units/ml of each sample was plotted against the time passage from the infection. From the graph, it can be understood that in case of phage MS2, the release of progeny phage from the bacteria starts approximately 35 minutes after the infection in the control (in which distilled water was present instead of the compound of this invention) as indicated by the mark ●—●, while the release-starting time of the progeny phage is advanced by 5 – 10 minutes in the presence of the compound of this invention (▲—▲); and that little appreciable difference exists in average burst size between these curves. This fact demonstrates that the novel compounds of this invention possess the foregoing effect B, that is, contribute to increase the phage growth cycle within the definite time. Also as aforesaid, if the plaques are counted within approximately 20 minutes after the infection, phage-infected bacteria can be selectively counted, because no progeny phage is yet released. Whereas, when the plaques are counted after approximately 35 minutes from the infection, the progeny phage released from the infected bacteria can be selectively counted. The "average burst size" of phage referred in the above means p.f.u. of the progeny phage/p.f.u. of the phage-infected bacteria, i.e., average production amount of progeny phage per one infected bacterium. For effecting one-step growth of phage, the suitable amount of the novel compound to be added ranges 30 – 300 mcg/ml, preferably approximately 100 mcg/ml; bacteria concentration ranges $10^7 - 10^9$ cells/ml. preferably $10^8$ cells/ml; and phage concentration is optional, preferably 10⁸ p.f.u./ml. The amount of phage antiserum depends on the antiserum value, which must be sufficient for inactivating uninfecting phage. Infection of bacteria with phage can be sufficiently performed within 5 minutes. At the above-specified bacterial and phage concentrations, the infection will be very quickly completed. The subsequent antiserum treatment may be given for approximately 3 minutes, during 5th – 8th minutes after the infection, with satisfactory result, while only one minute treatment can also achieve the inactivation of uninfecting phage.

The amount of each sample is variable depending on such factors as concentration of progeny phage, which is not critical, but preferably 0.1 ml.

As above-explained, the novel compounds of this invention exhibit the action of increasing the number of growth cycle of virus within the definite time. In order to determine whether the action is due to B)-1; acceleration of phage-producing rate inside the bacteria, or B)-2; shortening of phage-releasing time from the bacteria, with unchanged phage-producing rate inside the bacteria, the following experiment was conducted.

As already mentioned, the infection procedure was the same as the one-step growth experiment. Samples of 0.1 ml each were taken at various time intervals until 60 minutes, starting 10 minutes after the infection, with satisfactory result. Each sample was added to a conventional mixture for lysing bacteria, for example, a mixture of lysozyme-EDTA and buffer, to cause the lysozyme to act on the bacteria for 5 – 30 minutes, preferably 10 minutes, to cause the lysis of bacteria. The lysed mixtures were diluted appropriately. The compound of the invention employed was inactivated by the dilution mentioned as to the foregoing one-step growth experiment.

The resulting diluted samples were each mixed with bacteria in soft agar culture medium, and treated similarly to the foregoing. The phage concentration in each sample was measured by counting the plaques. In the graph given as FIG. 4, thus determined p.f.u./ml. (phage concentration) of each sample is plotted against time passage from the infection. FIG. 4 demonstrates that the amount of phage production is unchanged between the system containing the compound of this invention (▲—▲) and control (●—●). Whereby the conclusion is drawn that the phage growth cycle-increasing effect of the compounds of this invention as demonstrated in FIG. 1 is caused by the foregoing phenomenon B)-2.

Figure 2:
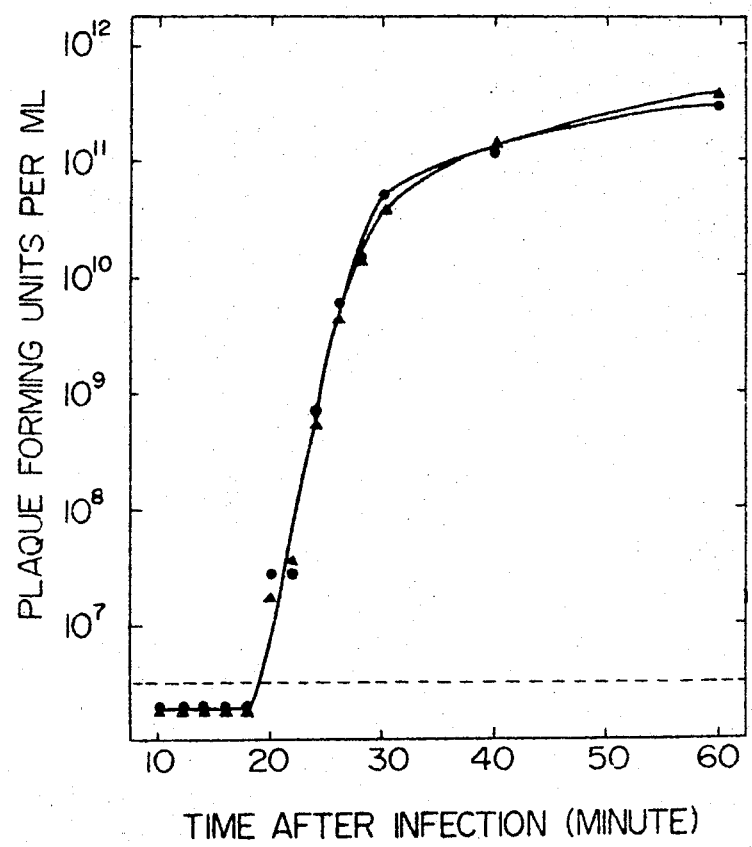

Referring to FIG. 2, the area below the dotted line, i.e., the interval between 10 – 18 minutes, corresponds to so-called "eclipse period."

The above conclusion is drawn through the following procedures. For example, under the assumptions that $a$ minutes are required from phage infection to progeny phage production, and that $b$ minutes are required for the produced progeny phage to be released from the bacteria, FIG. 1 indicates that $a + b$ is shortened in the presence of the compound of this invention. It is apparent that the total number of phage particles within and outside the bacteria was counted in the experiment relating to FIG. 2. Therefore, the p.f.u./ml value resulting from the experiment depends solely on $a$, i.e., phage-producing time. Whereas, FIG. 2 demonstrates that the phage-producing rate is identical between the system containing the compound of this invention, and the control system. Thus, the only logical conclusion is that the phage growth cycle-increasing effect of the subject compound is caused by the phenomenon B-2; i.e., although the phage-producing rate in the bacteria is unchanged, the releasing time of progeny phage from the bacteria is shortened.

We examined various compounds concerning this indeed surprising phage growth cycle-increasing effect, to find that the 4-nitropyrrole-2-carboxylic acid hydrozide derivatives of the formula,

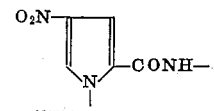

VII are effective. More particularly, the effective derivatives are those compounds of general formula, I, inter alia, the compounds specifically named in the earlier part of this specification.

Preferred phage include MS2, GA, and Qβ, and the preferred bacteria is *Escherichia coli*.

The above activity of the subject compounds of increasing the phage growth cycle indicates the following utility of the compounds: reagent for facilitating plaque formation of virus which difficulty forms plaque, or reagent for enlargement of plaque size for easier observation. Thus the compounds will make significant contribution in the field of virology. Furthermore, the compounds can be effectively used in the preparation of vaccine against the diseases caused by virus, which requires production of virus in large quantities, for shortening the time required for virus growth, and consequently, the time required for the vaccine preparation.

The following examples are given solely for the illustrative purpose of this invention, but never to restrict the scope thereof.

EXAMPLE 1

4-Nitropyrrole-2-carboxylic acid hydrazide

Ethyl 4-nitropyrrole-2-carboxylate (1.84 g) was dissolved in 5–10 ml of ethanol, and 6.2 g of hydrazine hydrate was added thereto. In a sealed tube they were reacted at 150° C. for 6–7 hours. The reaction mixture was concentrated under reduced pressure to dryness. The residue was sufficiently washed with dilute acetic acid, washed with water and dried. Recrystallization from methanol gave 1.1 g of the intended product in the form of faintly yellowish crystals melting at 263°–264° C.

EXAMPLE 2

4-Nitropyrrole-2-carboxylic acid hydrazide a. Preparation of 4-nitropyrrole-2-carboxylic acid chloride:

4-Nitropyrrole-2-carboxylic acid (1.5 g) was refluxed in an oil bath for 30–45 minutes together with 11.9 g of thionyl chloride, and then the excessive thionyl chloride was distilled off to give 1.8 g of the intended product.

b. Preparation of 4-nitropyrrole-2-carboxylic acid hydrazide:

4-Nitropyrrole-2-carboxylic acid chloride (1.75 g) was dissolved in anhydrous benzene, and the resulting solution was added dropwise to an emulsion of 1.0 g of anhydrous hydrazine in anhydrous benzene at room temperature. Precipitated crystals were recovered by filtration and washed with dilute acetic acid, followed by water-washing and drying. Recrystallization from methanol gave 1.5 g of the intended product in the form of faintly yellowish crystals melting at 263°–264° C.

EXAMPLE 3

1-Methyl-4-nitropyrrole-2-carboxylic acid hydrazide

Ethyl 1-methyl-4-nitropyrrole-2-carboxylate (1.9 g) was dissolved in 5–10 ml of ethanol, and 6.2 g of hydrazine hydrate was added thereto. In a sealed tube they were reacted at 150° C. for 6–7 hours. After completion of the reaction, the reaction mixture was concentrated to dryness under reduced pressure. The residue was washed with water, dried and recrystallized from methanol to give 1.2 g of the intended product in the form of colorless crystals melting at 228°–229° C.

EXAMPLE 4

1-Methyl-4-nitropyrrole-2-carboxylic acid hydrazide a. Preparation of 1-methyl-4-nitropyrrole-carboxylic acid chloride:

1-Methyl-4-nitropyrrole-2-carboxylic acid (1.64 g) was refluxed with 11.9 g of thionyl chloride in an oil bath for 30–45 minutes and the excessive thionyl chloride was distilled off to obtain 1.9 g of the intended product.

b. Preparation of 1-methyl-4-nitropyrrole-2-carboxylic acid hydrazide:

1-Methyl-4-nitropyrrole-carboxylic acid chloride (1.89 g) was dissolved in anhydrous benzene, and the solution was added dropwise to an emulsion of 1.0 g of anhydrous hydrazine in anhydrous benzene at room temperature with stirring. Precipitated crystals were recovered by filtration, washed with water, dried and recrystallized from methanol to give 2.0 g of the intended product in the form of colorless crystals melting at 228°–229° C.

EXAMPLE 5

2-Amidinocarbamoyl-4-nitropyrrole

4-Nitropyrrole-2-carboxylic acid chloride (1.75 g) was dissolved in anhydrous benzene, and the solution was added dropwise to an emulsion of 1.2 g of guanidine in anhydrous benzene at room temperature with stirring. Precipitated crystals were recovered by filtration, washed sufficiently with water, dried and recrystallized from methanol to give 1.6 g of the intended product in the form of faintly yellowish crystals melting above 270° C.

EXAMPLE 6

2-Amidinocarbamoyl-1-methyl-4-nitropyrrole

1-Methyl-4-nitropyrrole-2-carboxylic acid chloride (1.89 g) was dissolved in anhydrous benzene, and the solution was added dropwise to an emulsion of 1.2 g of guanidine in anhydrous benzene at room temperature with stirring. Precipitated crystals were recovered by filtration, washed with water, dried and recrystallized from methanol to give 1.7 g of the intended product in the form of faintly yellowish crystals melting at 219°–221° C.

EXAMPLE 7

4-Nitropyrrole-2-carboxylic acid isopropylidenehydrazide

4-Nitropyrrole-2-carboxylic acid chloride (1.75 g) was dissolved in anhydrous benzene, and the solution was added dropwise to 1.44 g of acetone hydrazone in anhydrous benzene at room temperature with stirring. Precipitated crystals were recovered by filtration, washed with water, dried and recrystallized from acetone to give 1.8 g of the intended product in the form of faintly yellowish crystals melting at 247°–248° C.

EXAMPLE 8

4-Nitropyrrole-2-carboxylic acid isopropylidenehydrazide

Ethyl 4-nitropyrrole-2-carboxylate (1.84 g) and 2.2 g of acetone hydrazone were dissolved in ethanol and the mixture was reacted in a sealed tube at 150° C. for 6–7 hours. The reaction mixture was concentrated under reduced pressure and the residue was washed with dilute acetic acid, followed by water-washing and drying. Recrystallization from acetone gave 1.0 g of the intended product in the form of faintly yellowish crystals melting at 247°–248° C.

EXAMPLE 9

4-Nitropyrrole-2-carboxylic acid isopropylidenehydrazide

4-Nitropyrrole-2-carboxylic acid hydrazide (1.7 g) prepared in accordance with the method described in Example 1 or 2 was refluxed in acetone for several minutes and filtered. The filtrate was concentrated to dryness, and the residue was recrystallized from acetone to give 1.9 g of the intended product in the form of faintly yellowish crystals melting at 247°–248° C.

EXAMPLE 10

1-Methyl-4-nitropyrrole-2-carboxylic acid isopropylidenehydrazide

1-Methyl-4-nitropyrrole-2-carboxylic acid chloride (1.89 g) was dissolved in anhydrous benzene, and the solution was added dropwise to 1.44 g of acetonehydrazone in anhydrous benzene at room temperature with stirring. Precipitated crystals were recovered by filtration, washed with water, dried and recrystallized from acetone to give 1.8 g of the intended product in the form of faintly yellowish crystals melting at 210°–212° C.

EXAMPLE 11

1-Methyl-4-nitropyrrole-2-carboxylic acid isopropylidenehydrazide

1-Methyl-4-nitropyrrole-2-carboxylic acid hydrazide (1.8 g) prepared in accordance with the method described in Example 3 or 4 was heated in acetone to dissolve the hydrazide therein, followed by filtration. The filtrate was concentrated to dryness and the residue was recrystallized from acetone to give 2.1 g of the intended product in the form of faintly yellowish crystals melting at 210°–212° C.

EXAMPLE 12

1-Methyl-4-nitropyrrole-2-carboxylic acid isopropylidenehydrazide

4-Nitropyrrole-2-carboxylic acid isopropylidenehydrazide (2.1 g) prepared in accordance with the method described in Example 7, 8 or 9 was suspended in anhydrous ethanol containing 0.54 g of sodium methylate. To the suspension, 4.3 g of methyl iodide was added dropwise at room temperature, and the mixture was stirred for 4–5 hours. After completion of the reaction, the reaction mixture was concentrated under reduced pressure, and 5 percent hydrochloric acid was added to the residue. Insoluble matters were removed by filtration, washed with water, and dried. The residue was chromatographed over silica gel and the column was eluted with a 1:2 mixed solvent of acetone and chloroform. The first eluate was collected and the solvent was distilled therefrom. Then, the residue was recrystallized from acetone to give 0.51 g of the intended product in the form of faintly yellowish crystals melting at 210°–212° C.

EXAMPLE 13

4-Nitropyrrole-2-carboxylic acid (1-phenyl)ethylidenehydrazide

4-Nitropyrrole-2-carboxylic acid hydrazide (1.7 g) prepared in accordance with the method described in Example 1 or 2, and 1.32 g of acetophenone were refluxed in methanol. After the system had been cooled, precipitated crystals were collected by filtration and recrystallized from methanol to give 2.5 g of the intended product in the form of faintly yellowish crystals melting at 247°–249° C.

EXAMPLE 14

1-Methyl-4-nitropyrrole-2-carboxylic acid (ortho-hydroxy) benzylidenehydrazide

1-Methyl-4-nitropyrrole-2-carboxylic acid hydrazide (1.84 g) prepared in accordance with the method described in Example 3 or 4, and 1.34 g of salicylaldehyde were refluxed in methanol to dissolve the hydrazide therein. After the system had been cooled, precipitated crystals were recovered by filtration and recrystallized from methanol to give 2.8 g of the intended product in the form of faintly yellowish needles melting above 260° C.

EXAMPLE 15

Enlargement effect in the plaque size of phage MS 2

0.1 ml of an overnight broth culture of E. coli E102 obtained in a customary manner and 0.1 ml of a phage preparation (1,000–3,000 p.f.u./ml) obtained by propagation and dilution in a customary manner were mixed with 2.5 ml of a melted soft agar medium containing the compound B, E, F or H (100 μg/ml) (said medium having been prepared from 5 g of NaCl, 5.5 g of agar, 20 g of peptone, 2 g of glucose and 1,000 ml of distilled water, and the pH thereof having been adjusted to 7.2 with 1N NaOH aqueous solution). The resulting mixture was poured onto a petri dish containing a basic agar layer containing the compound B, E, F or H at the same concentration as in the soft agar medium (said layer having been prepared from 15 g of agar, 10 g of peptone, 5 g of NaCl and 1,000 ml of distilled water and the pH thereof having been adjusted to 7.2 with 1N NaOH aqueous solution). The incubation was made at 37° C. overnight, and the size of the resulting plaque was observed.

The above experiment was carried out in the same manner except using instead of the said compound an equal amount of distilled water, and the size of the resulting plaque was observed (control).

The results are shown in Table 1 below.

TABLE 1

| Sample compound | Enlargement of plaque size |
|---|---|
| Compound B (PY 10) | + |
| Compound E | + |
| Compound F | + |
| Compound H | + |

+ : more than twice as great as the normal plaque diameter (of control).

EXAMPLE 16

Enlargement effect in plaque sizes of various phages

Experiments were performed in the same manner as in Example 15 by using the compound B and as phage MS2, GA and Qβ, respectively. The sizes of the resulting plaques were observed. The results are shown in Table 2 below.

TABLE 2

| Phage | Enlargement of plaque size |
|---|---|
| MS2 | + |
| GA | + |
| Qβ | + |

+ : more than twice as great as the normal plaque diameter (control).

EXAMPLE 17

Effect of compound B on the one-step growth of phage MS2

E. coli E 102 grown in PGYC medium (consisting of mixture of 20 g of peptone, 5 g of NaCl, 2 g of glucose, 0.25 percent of yeast extract 0.01 mole of $CaCl_2$ and 1,000 ml of distilled water, with the pH adjusted to 7.2 with 1N NaOH aqueous solution) at a density of $2.8 \times 10^8$ cells/ml was divided into 2 aliquots (4.5 ml each). To one of them compound B was added such that the concentration of compound B was 100 mcg/ml and the whole volume was 5 ml. To the other aliquot was added the same volume of distilled water instead of compound B as a control. Both aliquots were infected with phage MS2 at a multiplicity of infection of 1.3 (Multiplicity of infection is the ratio of phage concentration: E. coli concentration). Five minutes after the infection, phage MS2 antiserum (K. value: 5,500) was added to each aliquot to form a 100 times dilution of said antiserum. Phage MS2 was subjected to an action of said antiserum for 3 minutes, whereby the uninfected phage MS2 was inactivated. Immediately thereafter, 0.1 ml of each aliquot was diluted $10^4$–$10^6$ times. Samples were prepared by taking 0.1 ml of each dilution 10, 12, 15, 20, 25, 30, 35, 40, 45, 50, 55, 60, 70, 80, 90 and 100 minutes after the infection respectively, and diluting each fraction $10^2$–$10^4$ times (by this dilution the activity of the compound was lost). The plaque was formed in the same manner as in Example 15 by using, instead of the phage preparation, each of the above samples individually without addition any active compound used in Example 15. The values of p.f.u./ml of the phage MS2 contained in each sample were determined by counting the number of resulting plaques. The curves shown in FIG. 1 were obtained by plotting these values. The curve drawn by the line —▲—▲— is that of the aliquot in which the compound B was present, and the curve drawn by the line -.-.- is that of the aliquot in which distilled water was replaced instead of the compound B (control).

EXAMPLE 18

Effect of compound B on the production of intracellular phage

Plaques were formed in the same manner as in Example 17 except that samples were taken from each aliquot 10, 12.5, 15, 17.5, 20, 22.5, 25, 27.5, 30, 32.5, 40 and 60 minutes after the infection, respectively, and 0.9 ml of a lysis mixture [0.7 ml of 1/20 M tris-HCl buffer (pH=8.0), 0.1 ml of a lysozyme solution (2 mg/ml), 0.1 ml of EDTA (40 mg/ml) and two drops of chloroform] was added to 0.1 ml of each sample just after the Sampling, followed by cell-lysis at 37° C. for 10 minutes. The p.f.u./ml values of phage MS2 contained in each sample were determined by counting the number of the formed plaques. Curves shown in FIG. 2 were obtained by plotting these values. The curve drawn by the line —▲—▲— is that of the aliquot in which the compound B was present, and the curve drawn by the line -.-.- is that of the aliquot in which distilled water was replaced instead of the compound B (control).

EXAMPLE 19

Tablets, each containing the following components, were prepared by the conventional tablet-making method:

| | |
|---|---|
| 1-Methyl-4-nitropyrrole-2-carboxylic acid hydrazide | 200 mg |
| Avicel (microcrystalline cellulose) | 50 mg |
| Corn starch | 46 mg |
| Colloidal silicic acid with hydrolyzed starch | 2 mg |
| Magnesium stearate | 2 mg |
| Total: | 300 mg |

We claim:

1. A 4-Nitropyrrole-2-carboxylic acid amide derivatives of the formula

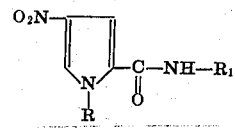

wherein R is selected from the group consisting of hydrogen and alkyl of one to eight carbon atoms, and $R_1$ is

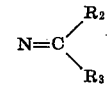

$R_2$ and $R_3$ each being independently selected from the group consisting of hydrogen, alkyl of one to eight carbon atoms, phenyl, and substituted phenyl wherein the substituent is selected from hydroxyl, carboxyl, alkyl of one to five carbon atoms, alkoxy of one to five carbon atoms, halogen, and nitro.

2. A 4-nitropyrrole-2-carboxylic acid amide derivatives of claim 1, wherein R is selected from the group consisting of hydrogen and methyl, and $R_1$ is selected from the group consisting of N-isopropylideneamino, N-(1-phenyl)ethylideneamino, and N-(ortho-hydroxy)benzylideneamino.

* * * * *